Aug. 30, 1966 L. J. COLEMAN 3,269,764
TONGS
Filed June 30, 1964 2 Sheets-Sheet 1
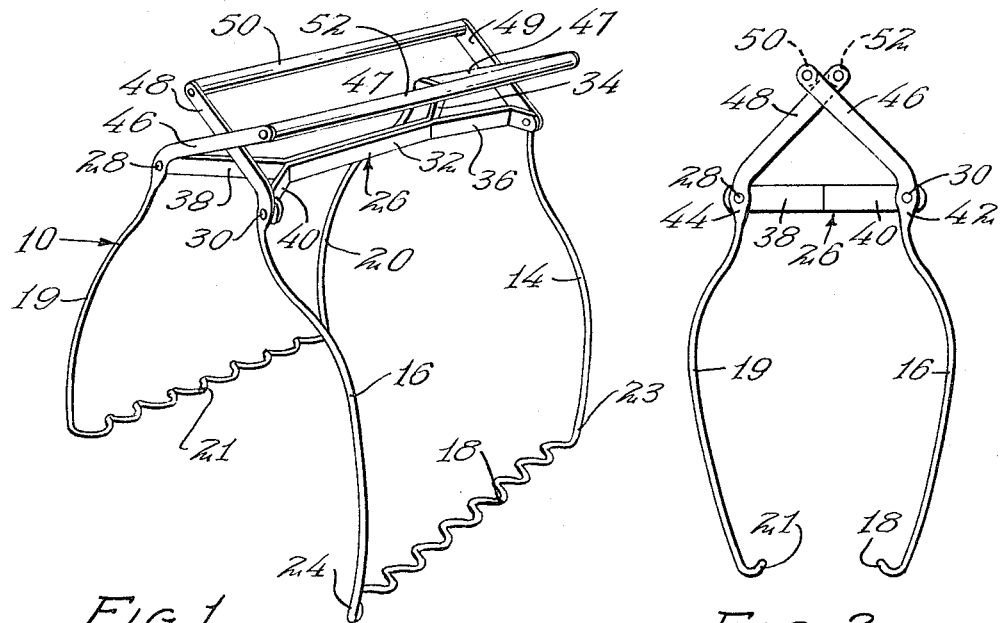
FIG. 1
FIG. 2
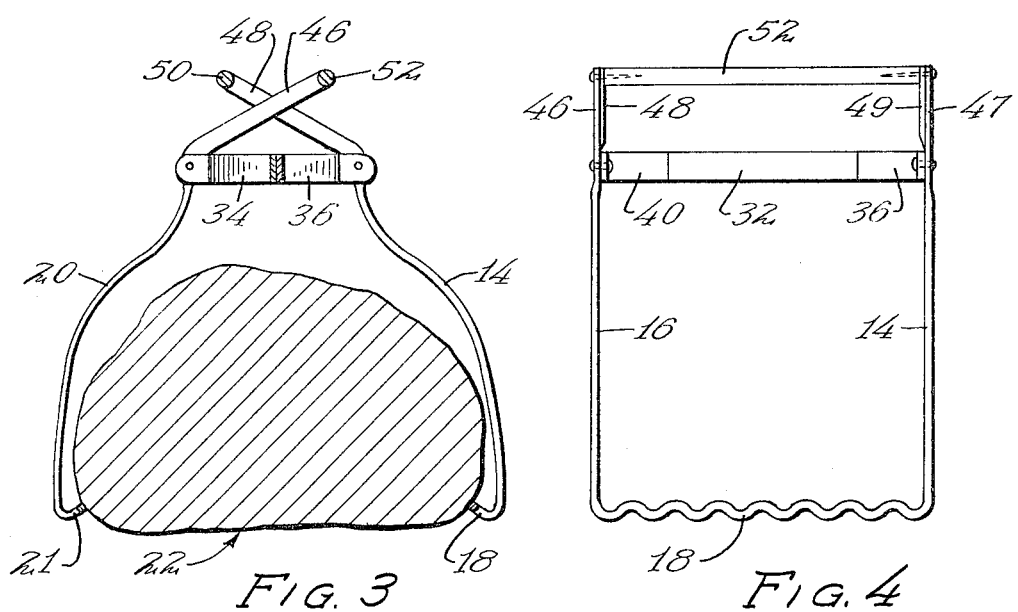
FIG. 3
FIG. 4
INVENTOR
LAWRENCE J. COLEMAN
BY Robert M. Dunning
ATTORNEY Aug. 30, 1966 L. J. COLEMAN 3,269,764
TONGS Filed June 30, 1964 2 Sheets-Sheet 2

INVENTOR
LAWRENCE J. COLEMAN
BY Robert M. Dunning
ATTORNEY

United States Patent Office 3,269,764
Patented August 30, 1966

3,269,764
TONGS
Lawrence J. Coleman, 938 Arkwright, St. Paul, Minn.
Filed June 30, 1964, Ser. No. 379,096
5 Claims. (Cl. 294—16)

This application relates to tongs particularly adapted for removing roasts, fowl, and similar large pieces of solid food from broilers, roasters, and the like, the tongs being particularly adapted to accommodate variance in the sizes of the food or meat being handled, and having means whereby the food may be more easily raised from its container or surface, and the unique construction whereby the handle and frame bar relationship through which the tong arms are operated provide unusual sureness, ease of operation, and mechanical advantage.

As is generally well known, when attempting to remove roasts, large fowl such as turkey and the like from a roasting pan or surface, a great deal of difficulty is encountered. Generally, attempts are made to introduce some form of lifting support beneath the roast or fowl by which it may be raised and some form of impaling instrument such as a fork is used to steady the roast or fowl as it is being raised. This has not proven to be particularly satisfactory. As is further well known, the variances in the shape of roasts and the shape of the various fowl make it extremely difficult to provide the proper lifting and holding support.

I provide a pair of generally U-shaped arms which are outwardly bowed, a brace means securing the arms of the U-shaped members in pivotal relation to the brace member at a point of securement equidistant from the bar ends of the U-shaped members. Further, I provide inwardly disposed handle ends by which the U-shaped members may be moved toward and away from each other. It is an object of the present invention to provide lifting tongs which are adapted to be used with fowl and roasts and other large food objects of varying sizes in order to raise them securely from a surface on which they are placed.

It is a further object to provide a lifting tongs having the bar shaped ends of the lifting tongs slit inwardly in relation to the arm members so as to provide a cradling support to the object being lifted and to more easily enable the tongs to be placed in the proper lifting position.

It is a further object of the present invention to provide a tongs whereby the U-shaped members are held in spaced relation by a brace member thereby enabling the tongs to provide a cradle support throughout their operating length.

It is a further object of the present invention to provide tongs which may be made at a relatively inexpensive cost, and which perform their intended function in a highly desirable manner, and which will remain serviceable throughout their life. It is a further object of the present invention to provide tongs having generally U-shaped opposed members to cradle and support the object to be lifted in which the U-shaped members are pivoted from a brace member in which the points of pivotal engagement of the U-shaped arms to the brace member are unlikely to become coated with grease or other residue from the food being lifted.

It is a further object of the present invention to provide tongs having generally resilient U-shaped members in opposed relation enabling the tongs to conform somewhat generally to the shape of the food object being raised and moved.

In the preferred form of construction, I provide extension ends on the arms of the U-shaped members, the extension ends being inwardly angularly disposed over the brace member and in crossed side by side relation to the opposed end extension of the opposite arm. Elongated handles extend between the terminal end portions of the arm members whereby a movement of the handle induces related movement of the parallel arm members of the U-shaped member. The brace member holding the U-shaped members in spaced opposed relation has parallel aligned pivots thereby enabling the opposed U-shaped members to function cooperatively. The spacing of the U-shaped members in pivotal engagement with the brace member enables the U-shaped members to conform generally to the shape of the object being lifted. The bar member which extends between the generally parallel arms of the U-shaped member is preferably angled inwardly away from the arms to enable the bar member to move easily provide support to the object being lifted. The bar in preferred construction may be waved like to provide an increased supporting surface beneath the object to be lifted.

A modification of the device is provided in the form of tongs in which the inward extensions of the arms are somewhat counterturned in the direction of elongation of the arms, the counterturned extremity having somewhat elongated apertures. Side by side arm extensions have their apertures registrable in order that a pin member may be inserted through the apertures to engage a single elongated handle intermediate the pairs of crossed arm extensions. The handle supported by the pins extending through the registrable apertures which are arcuate to conform to the counterturning of the arm extremities induce opening and closing of the U-shaped members to accept or release an object.

These and other objects and particular advantages of the invention will be more particularly described and detailed in conjunction with the accompanying drawings and the specification herein.

In the accompanying drawings:

FIGURE 1 is a perspective view of the tongs illustrating tongs having a pair of handles and particularly illustrating the spaced relation of the U-shaped members in pivotal engagement with the brace member.

FIGURE 2 is an end elevation of the dual handle tong of FIGURE 1.

FIGURE 3 is an end elevation of the dual handled tongs in lifting relation to a roast.

FIGURE 4 is a side elevation illustrating the wavelike outline of the bar support member.

Figure 5:
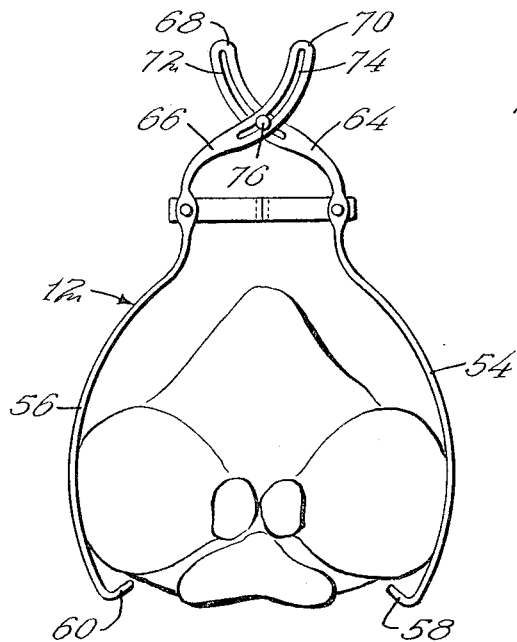
FIGURE 5 is a side elevation of a modified tongs having arcuate arm extension with registrable apertures in the extension to which a pin means extends to engage an elongated handle.

I provide a tongs such as are illustrated in FIGURES 1 and 5, the preferred construction being generally numbered 10 and having dual handles, and the modified form of construction generally numbered 12 having a single handle. The handle relationships in both the dual and single constructions will be further described.

Turning to FIGURE 1 as may be seen I provide a pair of generally U-shaped members having similar parts in opposition to each other. Each U-shaped member comprises a pair of arms such as 14 and 16 which are connected at their ends to a bar support connecting member 18 to provide the U-shape.

As may be seen in FIGURE 2 when viewed from the side in elevation, the arms of the U-shaped members are elongated, the bar support members such as 18 and 21 extending in angled relation to the arms. The angled relation of the support bar enables the bar to be more readily inserted beneath a food object to be lifted such as a roast, as may be seen in FIGURE 3, and which is generally numbered 22.

As may be seen opposed pairs of arms are in outwardly bowed relationship to each other to enable the arms to more generally conform to the usual shape of the fowl or roast which is being raised and moved.

While the bar support members may be separately secured to ends such as 23 and 24 of the arms 14 and 16 as is shown in FIGURE 1, in the preferred construction the U-shaped member is an integral unit.

Preferably the U-shaped members are of resilient construction, and are preferably non-corrosive. Obviously, various materials are suitable such as steel wire which may be alloyed or coated depending upon the usage for which it is intended. In normal usage the bar-shaped support members are generally at the downward end of the arms. Consequently, this usage of the word "downwardly" will be used in order to more readily locate other parts of the tongs in relation to the bars.

The U-shaped members as has been previously indicated are held in spaced apart relation, opposed arms being outwardly bowed away from their opposite counterpart. To hold the U-shaped members in spaced apart movably opposed relation, a brace member generally numbered 26 is provided as may be seen in FIGURES 1 and 2. The brace member 26 has pivots 28 and 30 in pivotally secured relation to the arms 19 and 16 at points equidistant from the support bars 21 and 18, the pivot members 28 and 30 being in a generally coplanar relation and parallel generally to each other. Similar pivots are provided at the other ends of the elongated brace member 26 to hold the arms 14 and 20 in pivotal relation to the brace, these pivot members being aligned with the pivots 28 and 30 its opposite counterpart (not shown).

The brace member 26 may comprise a generally X-shape structure as is illustrated or any other convenient outline in which spaced, aligned, parallel pivots are provided for engagement with respective opposed arms of the U-shaped members.

It will be apparent that the relationship of pivots such as 30 which engage pivotally the spaced arms 16 and 14 of one U-shaped member are in aligned, spaced, relation so that U-shaped member pivots towards and away from the opposed U-shaped member. Further, it will be apparent that pivots such as 28 and 30 and the similar pivots at the other end of the brace member which engage opposed arms such as 16 and 19 are in parallel relation.

I have found that by providing a spacing member such as 26 of a sufficient width to support the U-shaped members, I am enabled to provide a tongs which will be adapted to conform to the general outline of the roast or fowl with which it is to be used. It will be obvious in view of FIGURES 3 and 5 that the brace member permits the outwardly bowed arms to readily conform to the outline of the object being raised. Additionally, the spaced relation of the pivots of the U-shaped members enables the tongs to provide an increased mechanical advantage in firmly supporting the object being raised or moved.

In the generally X-shaped brace member illustrated, the brace member has an intermediate bar portion 32 having bifurcated outwardly diverging ends 34, 36, 38 and 40. The end extremities of the bifurcated ends are positioned in parallel planes to provide a bearing surface for the spaced aligned parallel pivots previously described enabling the opposed arm members to pivot toward and away from each other in planes perpendicular to the direction of elongation of the brace member 26. Obviously, the brace member could be a rectangular plate, but in the preferred construction shown, the intermediate bar portion 32 between the bifurcated ends of the brace member provide a handle which may be engaged by the fingers of the person manipulating the tongs when operating the handles.

The portions of the arms which are pivotally secured to the brace member may be flattened as is illustrated in FIGURE 2 to provide the bearing surfaces 42 and 44 and similar surfaces on the other spaced parallel arms. Extensions of the elongated arms extend generally inwardly to overlie the axis of the brace member 26, the flattened arm end extensions of opposed arms being in crossed side by side relation. Arm end extensions 46 and 48 are provided on arms 16 and 19, it being understood that similar arm extensions 47 and 49 are provided on the arms 20 and 14 at the opposite end of the U-shaped members.

A handle means 50 connects the terminal ends of the end extensions 48 and 49 and a similar handle 52 connects the terminal ends of the end extensions 46 and 47.

As will be apparent in viewing FIGURES 1 and 2, movement of the handles 50 and 52 induces related movement of the arms to which they connect. When the handles 50 and 52 are in spaced apart relation, similar spaced apart relation of the support bars 18 and 21 is produced. When the handles 50 and 52 are in proximity similarly the bar support members 18 and 21 are in proximity.

It will be apparent that the person moving the handles may engage the bar 32 of the brace to provide increased leverage in moving the handles closed together or urging them apart.

Figure 6:
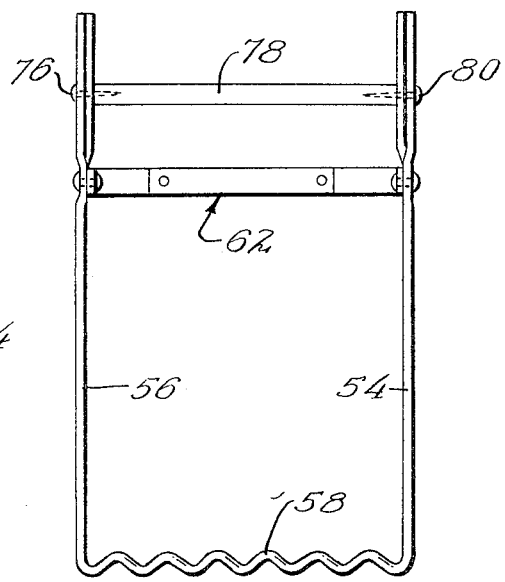
FIGURE 6 is a side elevation of the modified form of construction.
Figure 7:
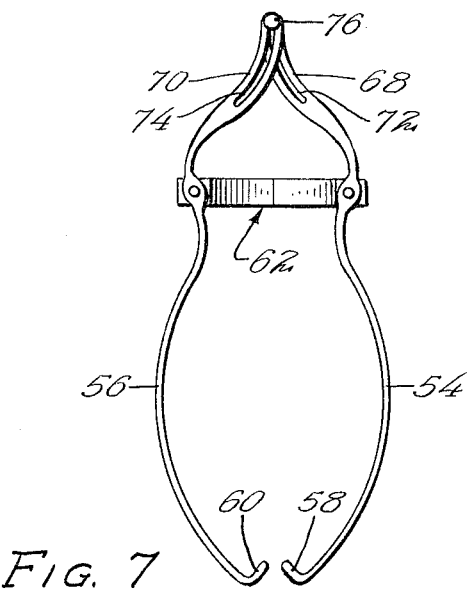
FIGURE 7 is an end elevation of the modified tongs illustrating the relationship of the arm extension when the U-shaped members are substantially in closed relation.

Turning to the modified form of construction illustrated in FIGURES 5, 6, and 7, it will be seen that a similar relationship of opposed outwardly bowed arm members is provided, the modification enabling single handle to be used. As may be seen clearly in FIGURE 5, the extreme end portions of the arm extension of the modified tongs 12 are in side by side relation. For purposes of description, different numbers will be used with the arms of FIGURES 5, 6, and 7 although it is understood that they are similar to those of the preferred construction.

As seen in FIGURE 5 the modified construction of the tongs has opposed outwardly bowed arms 54 and 56 having bar ends 58 and 60. A brace member 62 is provided to hold the opposed arms in spaced pivotal relation for movement toward and away from each other.

As the operation of the arms in relation to the brace has previously been described, no further description is believed necessary. The arm extensions 64 and 66 extend in inwardly angled overlying relation to the brace member 62 in a manner generally similar to that previously described. The end portions of the arm end extensions 64 and 66 are somewhat counterturned relative to the bow of the arms as may be clearly seen in FIGURES 5 and 7. The arcuately counterturned extremities 68 and 70 have apertures 72 and 74 which are relatively elongated, the apertures being in side by side relation and registrable to enable a pin 76 to be inserted through the apertures 72 and 74 to engage a handle 78. A similar pin 80 is provided to engage the other end of the handle 78, the pin 80 extending through similar apertures (not shown) end extremities of the other arms. As may be seen by viewing the FIGURES 5 and 7 when the handle 78 is in closest proximity to the brace 62, the bar supports 58 and 60 are furthest displaced away from each other. When the handle 78 is at the opposite end of the arcuate apertures, and furthest away from the brace 62, the bar supports 58 and 60 are in closest proximity.

It will be seen that the handle 78 may be readily moved toward or away from the brace 62 thereby inducing a related movement of the bar supports 58 and 60. The handle 78 is in relatively close relation to the brace 62 so that the brace 62 may be engaged by the fingers of the person operating the tongs to urge the handle toward or away from the brace member.

It will be obvious that the bar support members may be at any desired angled relation to the ends of the arms to which they connect, but I have found that the upward angling of the bar support enables the supports to more readily conform in supporting relation to the object which it is desired to lift. Additionally it is obvious that by providing the wavelike outline of the bar support shown in FIGURES 4 and 6, that a greater surface is provided for support.

It is to be noted that by providing the spaced aligned parallel pivots I provide means of obtaining a spaced relationship of the U-shaped members which not only enables the U-shaped members to conform more readily to the outline of the object being grasped but further result in positive control of the U-shaped members in opposition to each other, and in addition stabilize the opposition of opposed arms to each other and the side by side relation of the arm in extensions as well.

As may be seen in viewing FIGURES 3 and 5, the spaced outwardly bowed opposed arms cradle the object in a very positive fashion.

I have found that the spaced opposed relation on parallel aligned pivotal axes of the U-shaped arms of either the preferred or modified construction provides a device which eliminates the likelihood of dropping the fowl or roast while it is being removed from a particular pan or surface, and that the shaped configuration of the arm members in pivoted relation to the brace member enables a cradling which was previously unobtainable.

In accordance with the patent statutes I have set forth the best embodiments of my invention, and I desire to have it understood that obvious changes may be made within the scope of the accompanying claims without departing from the spirit of my invention.

I claim:
1. A tongs including:
   (a) a pair of opposed, generally U-shaped members,
   (b) each U-shaped member including a bar end and a pair of generally parallel outwardly bowed arms extending from opposite ends thereof,
   (c) a brace extending between both pairs of arms intermediate the ends thereof,
   (d) pivot means connecting each pair of arms to said brace, said pivot means being in spaced parallel relation,
   (e) said arms having end portions extending upwardly and inwardly beyond said pivots to be in crossed relation,
   (f) elongated handle means secured to the end portions of said arms, and
   (g) said bar end extending upwardly and inwardly from the lower ends of the arms of each pair.
2. The structure of claim 1 and in which said bar end is of wavy form.
3. The structure of claim 1 and in which said handle end comprises a pair of handles each connected between the ends of a U-shaped member, the handles being relatively close together when said bar ends are close together.
4. The structure of claim 1 and in which the crossed portions of said arm ends are arcuately counterturned relative to the outwardly bowed arms, said counterturned arm ends having elongated arcuate apertures in registrable relation at least one point of movement of said arms, pin means extending through said registrable apertures in engagement with said handle means, including a rigid handle extending between said spaced apart crossed portions, whereby said handle means is movable in relation to said arcuate apertures toward or away from said brace member, and whereby related movement of said bar ends is induced.
5. A tongs adapted to hold roasts, fowl, and the like comprising:
   (a) a pair of spacedly opposed, outwardly bowed, generally elongated U-shaped members,
   (b) each said U-shaped member comprising a bar end and a pair of generally parallel arms extending from opposed ends of said bar,
   (c) an elongated brace member extending intermediate said opposed U-shaped members having spaced apart generally parallel pivots extending through said arms,
   (d) pivots connecting said parallel arms of a said U-shaped member being in spaced axial alignment and generally equidistant from said bar end,
   (e) said arms having end portions extending inwardly beyond said brace member,
   (f) opposed arm end portions of the two U-shaped members being in crossed relation,
   (g) elongated handle means including a pair of generally parallel handles secured to paired end portions of said parallel arms of said U-shaped members,
   (h) whereby movement of said handles toward and away from each other induces related movement of said bar ends.

References Cited by the Examiner
UNITED STATES PATENTS

| | | | |
|---|---|---|---|
| 1,564,436 | 12/1925 | Messinger | 294—16 |
| 1,717,194 | 6/1929 | Daoust | 294—106 |
| 2,747,917 | 5/1956 | Smith | 294—116 |
| 2,997,326 | 8/1961 | Daum | 294—16 |

GERALD M. FORLENZA, *Primary Examiner.*

R. G. SHERIDAN, *Assistant Examiner.*